Dec. 12, 1950 W. C. MOORE 2,533,496
LOW-LEVEL BRIDGE DISCRIMINATOR
Filed April 18, 1946
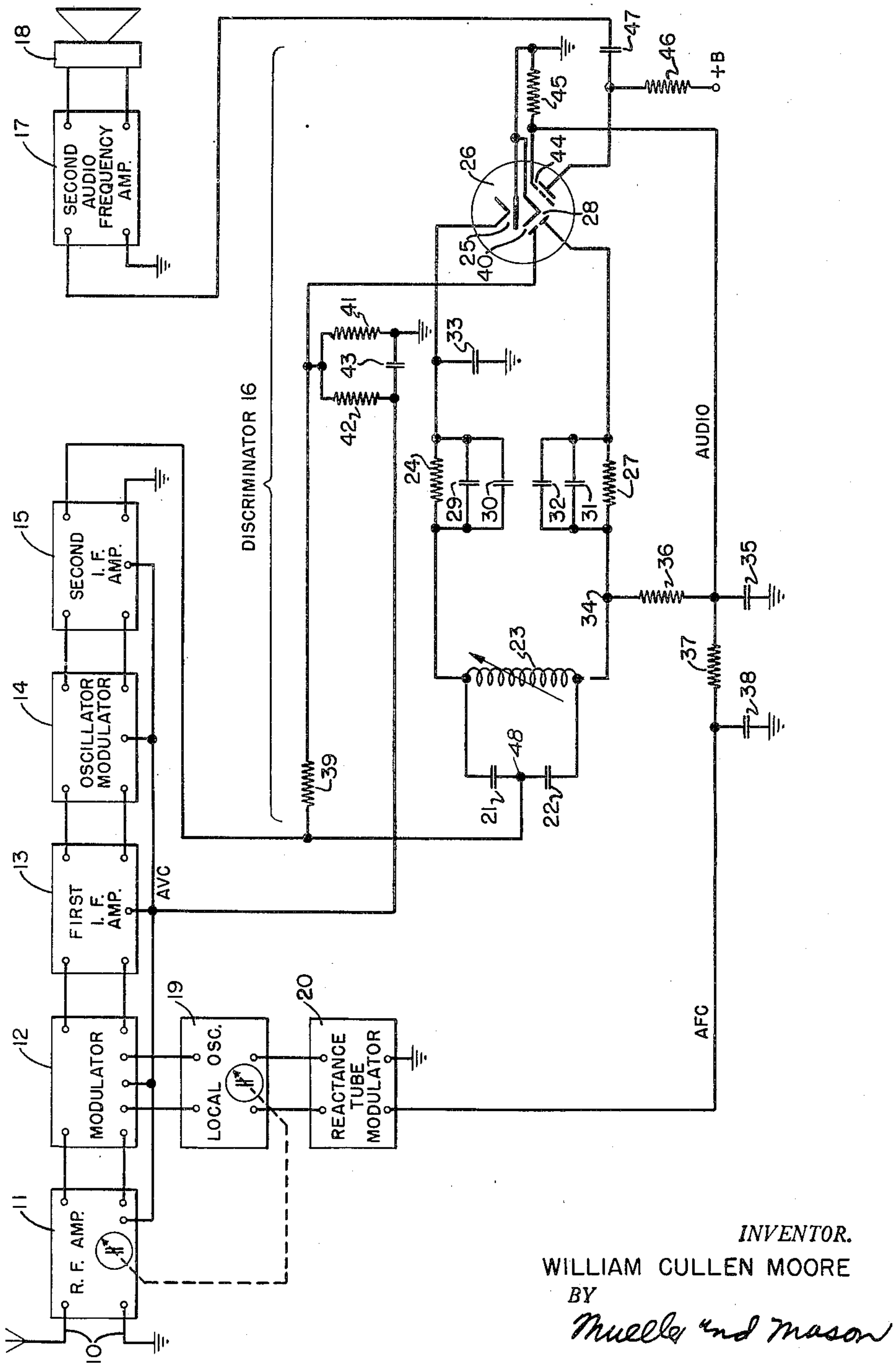
*INVENTOR.*
WILLIAM CULLEN MOORE
*BY*
Mueller and Mason
ATTORNEYS Patented Dec. 12, 1950 2,533,496

UNITED STATES PATENT OFFICE 2,533,496

LOW-LEVEL BRIDGE DISCRIMINATOR

William Cullen Moore, Chicago, Ill., assignor to Motorola, Inc., a corporation of Illinois Application April 18, 1946, Serial No. 662,945

5 Claims. (Cl. 250—27)

This invention relates generally to frequency discriminators and in particular to an improved frequency discriminating network for use in frequency modulation radio receiving systems.

Radio frequency discriminators utilized in frequency modulated radio receivers for detecting the audio frequency components of a modulated intermediate frequency carrier generally comprise a resonant circuit tuned to the intermediate frequency and designed to respond to frequencies which are greater or less than this frequency. These circuits provide varying voltages corresponding to the variable frequencies applied thereto which are applied to parallel rectifying paths which translate the variable intermediate frequency to an audio frequency signal. In such circuits a separate dual-diode rectifier tube is required for the rectifying paths and additional tubes are required for obtaining voltages which can be used for automatic gain control of the radio receiver. Also, one or two limiters are generally used ahead of the discriminator, which also require vacuum tubes. In so-called "ratio discriminators" which operate from low level input signals, the generation of a voltage for automatic frequency control requires two diodes off ground, thus precluding use of tubes developed commercially for frequency modulated signal receivers. This results in the use of a large number of tubes in the radio receiver requiring a large chassis for mounting the tubes and a large number of other circuit components.

It is an object of the present invention, therefore, to provide an improved frequency discriminator which is simple in arrangement and which requires a minimum number of tubes.

It is a further object of this invention to provide a frequency discriminator which provides an audio signal output from low level frequency modulated signals, thus eliminating the necessity for using limiters.

It is another object of this invention to provide a low level discriminator which provides audio frequency signal detection and also acts to provide a control voltage for automatic gain control of the receiver.

A still further object of this invention is to provide a frequency discriminator which utilizes but a single tube and yet provides audio signal detection, plus voltages for automatic frequency control and automatic gain control.

A feature of this invention is the provision of a discriminating network including a permeability tuned resonant input circuit and parallel rectifying paths in which the voltages across the paths may be combined differentially to produce an audio frequency signal and an automatic frequency control voltage which varies plus and minus with respect to ground.

A further feature of this invention is the provision of a discriminating network including parallel rectifying paths and a resonant input circuit for providing varying voltages to said paths from low level frequency modulated signals, with the audio output being obtained as the difference in the voltages across the two rectifying paths whereby noise signals will cancel out and not appear in the audio signal.

A still further feature of this invention is the provision of a discriminating network including two parallel rectifying paths each of which includes a load resistor bypassed by a large capacitor to provide a long time constant for the loads resulting in voltages being stored in the loads which may be combined to provide an automatic frequency control voltage varying plus and minus with respect to ground.

Still another feature of this invention is the provision of a discriminating network composed of two parallel rectifying paths each including a diode plus an automatic gain control circuit including a diode for rectifying a portion of the input signal to the discriminator, wherein the three diodes are combined into a single envelope as available in a commercially available tube type thus reducing the number of tubes required.

Further objects, features and advantages of the invention will be apparent from the following description taken in connection with the accompanying drawing which shows the circuit of a frequency modulation radio receiver in block diagram with the detail circuit of the frequency discriminator network shown in relation to the other components of the receiver.

In practicing my invention I provide a discriminating network having an input circuit including two identical capacitors bridged by a variable core inductor with a voltage source of variable frequency being applied at the midpoint between the capacitors. Parallel rectifying paths are provided between the terminals of the inductor and ground, with a capacitor connected between one of the rectifying paths and ground to unbalance the network and cause a current to flow through the resonant input circuit which is tuned to the center frequency of the particular intermediate frequency signal being received. The input circuit provides variable radio frequency voltages for the two rectifying paths depending upon the deviation of the frequency applied thereto from the center frequency. Each rectifying path includes a load resistor bypassed by capacitors to provide a long time constant and a radio frequency bypass therefor and a diode, with the diodes of the two rectifying paths being connected in series and the common connection grounded. The voltages developed across the two rectifying paths are differentially combined to provide a slowly changing voltage stored across the loads for automatic frequency control purposes and a dynamically varying voltage developed across the diodes which is the audio signal. A portion of the input signal is rectified to provide an automatic gain control voltage, a diode being used for this purpose which is enclosed in the same envelope as the two diodes of the rectifying paths of the discriminator circuit.

Referring now to the drawings, the present improved frequency discriminator is there illustrated in its embodiment in a frequency modulation wave signal receiver of the well known double superheterodyne type. In brief, this receiver comprises an antenna-ground circuit 10, a tunable radio frequency selector and amplifier 11, a modulator or mixer 12, a first intermediate frequency amplifier 13, an oscillator modulator 14, a second intermediate frequency amplifier 15, the present improved frequency discriminator 16, an audio frequency amplifier 17 and a loud speaker 18 connected in tandem in the order named. At the modulator stage 12 of the receiver, the usual tunable local oscillator 19 is provided, having its tuning element gang connected with the tuning instrumentalities of the radio frequency selector and amplifier 11 for unicontrol operation. To obtain automatic frequency control at this stage of the receiver, the local oscillator 19 is also coupled to a reactance tube modulator 20 having the function of varying the output frequency of the oscillator 19 within the narrow limits which may be required to hold the center frequency of a signal modulated carrier traversing the intermediate frequency section 13 of the receiver at a frequency value closely approximating the particular center frequency to which the pass circuits of this receiver section are fixed tuned.

Neglecting, for the present, the specific circuit arrangement of the discriminator 16 to which the present invention more particularly pertains, the receiver just described is substantially conventional and its mode of operation is well understood in the art. Briefly, however, frequency modulated signals intercepted by the antenna-ground circuit 10 are selected and amplified in the radio frequency amplifier 11, mixed with the output of the local oscillator 19 for conversion to a signal frequency modulated intermediate frequency carrier in the modulator 12, further selected and amplified in the first intermediate frequency amplifier 13, converted to a signal frequency modulated intermediate frequency carrier of lower center frequency in the oscillator-modulator 14, further selected and amplified in the second intermediate frequency amplifier 15 and delivered to the frequency discriminator 16 for signal detection. Following detection in the discriminator 16, the modulation components of the received signal are amplified in the audio frequency amplifier 17 and delivered to the loud speaker 18 for reproduction. Automatic gain (volume or amplification) control at the receiver sections 11, 12, 13, 14 and 15 and automatic frequency control at the receiver section 19 are obtained in a manner which will be fully apparent from the following explanation.

Referring now more particularly to the circuit arrangement of the discriminator 16, it is pointed out above that the frequency modulated carrier voltage appearing at the output side of the intermediate frequency amplifier 15 is impressed upon the discriminating network. Specifically, this voltage appears between ground and the common connection 48 between a pair of capacitors 21 and 22 which are bridged by an adjustable tuning inductance element 23 to form a resonant input circuit tuned to a predetermined center frequency equaling the second intermediate frequency for which the receiver is designed. This inductance element is of the permeability tuned type, being comprised of a coil having a powdered iron core adjustably positioned therein. The voltages appearing at the two terminals of the inductance element 23 are applied to two rectifying paths, the first extending through a bypassed load resistor 24 and the diode section 25 of an electron tube 26, and the second extending through a bypassed load resistor 27 and the diode section 28 of the tube. The load resistor 24 is shunted by two capacitors 29 and 30 having capacitance values such that a low impedance bypass is provided for radio frequency currents and the parallel R—C circuit thus formed has a relatively long time constant. Similarly, the load resistor 27 is shunted by two capacitors 31 and 32 which perform functions similar to those performed by capacitors 29 and 30. An unbalancing capacitor 33 is connected in parallel with the diode 25 for the purpose fully explained below. The output voltages from the discriminator are taken off at a signal take-off point 34. Specifically, detected audio signals appear across a capacitor 35 which is bridged between the signal take-off point 34 and ground through a radio frequency decoupling resistor 36.

An automatic frequency control circuit is also coupled to the signal take-off point 34 through the resistor 36 and an audio frequency decoupling network compris'ng a series resistor 37 and a shunt capacitor 38. An automatic gain control circuit is provided by connecting a resistor 39 between the discriminator input terminal 48 and a third diode section 40 of the tube 26. A portion of the input signal voltage is rectified in this circuit to appear across a load resistor 41 shunting the diode section 40. This voltage is negatively applied to the receiver stages 11, 12, 13, 14 and 15 through a filter network composed of a series resistor 42 and a shunt capacitor 43 to provide automatic gain control in these stages.

Referring now more particularly to the operation of the discriminator 16, it is pointed out above that the frequency modulated carrier appearing at the output side of the amplifier 15 is impressed upon the discriminator input circuit between ground and the junction connection 48 between the capacitors 21 and 22. This voltage appears in like polarity and amplitude across both diodes to ground through the low impedance radio frequency bypass capacitors across their respective load resistors. Without the unbalance capacitor the loads are symmetrical to ground and equal currents will flow in phase opposition around the electrical mesh formed by the resonant circuit containing capacitors 21 and 22 and inductor 23. Therefore, these currents will be in phase with the input current and will not produce an induced resonant current in the mesh. The addition of the unbalance capacitor 33 causes an unbalanced component of current having the same phase as the input current to flow in one direction through one element of the mesh formed by the resonant circuit. As is generally understood, the voltage induced across a resonant circuit is in phase quadrature to the initiating current within the mesh. Therefore, this unbalance current induces a resonant voltage across the resonant circuit which is in phase quadrature with the voltages produced by the balanced currents. These two quadrature voltages appearing across each diode circuit to ground add vectorially, the resonant voltage leading the reference voltage on one diode, and lagging on the other diode. As is well known in the art, if the frequency of an initiating current is close to but not at the resonant frequency of the resonant circuit into which it is introduced, the relative phase of the induced resonant voltage to the initiating current will be at some angle other than ninety degrees. This angle will vary as a function of the deviation of the frequency of the initiating current from that of the resonant circuit, and the resonant voltage induced in the resonant circuit will have a phase with respect to the initiating current which is greater or less than ninety degrees depending on whether the frequency of the initiating current is greater or less than the resonant frequency of the circuit. Thus, as the frequency of the initiating current is varied above and below the resonant frequency of the circuit, the vector representing the induced voltage at each diode will vary its angle with respect to the vector of the initiating signal, and will cause the resultant vector to vary in length in accordance with the amount by which the frequency of the signal current differs from the frequency of the resonant circuit. These voltages as rectified through the two diode sections 25 and 28 and differentially combined through the inductance element 23 result in the voltage difference appearing at the signal take-off point 34. Thus as the signal input or excitation frequency varies, a voltage is developed at the signal take-off point 34 which varies in magnitude directly in accordance with the extent of frequency departure from the center frequency to which the discriminator is tuned and changes polarity as the excitation frequency exceeds and falls below this center frequency.

In the usual case the voltage applied to the discriminator input circuit includes two separate frequency components, i. e., a slowly changing frequency variation caused by a shift of the carrier center frequency from the center frequency to which the discriminator input circuit is tuned and a dynamic variation representative of frequency modulation components of the received signal. As indicated above, the capacitor 29 bridging the load resistor 24 and the capacitor 31 bridging the load resistor 27 are relatively large such that these two parallel R—C circuits have long time constants. Accordingly, the relatively slow shifts of frequency with respect to the center frequency cause the long time constant load circuits to effectively store a direct current potential varying plus and minus with respect to ground. The dynamic shifting of the frequency utilized to carry the intelligence results in a dynamically variable voltage appearing across the diode in each branch. Since the average value of the voltage stored across the loads is substantially constant, because of the long time constants of the load circuits, the dynamically variable portions of the voltages appear as superimposed alternating voltages across the diode sections of the rectifying paths. The push-pull action of the voltages across the two diode sections in the bridge network thus formed results in a potential being developed between the signal take-off point 34 and ground which is a function of the instantaneous voltage drops across the diode sections and hence a function of the dynamic frequency variations.

There are, therefore, developed between the signal take-off point and ground two variable voltages, i. e., a slowly varying direct current potential varying plus and minus with respect to ground, and a dynamically variable voltage of audio frequency. The variable direct current voltage is of plus or minus polarity depending on whether the frequency is above or below the center frequency to which the discriminator input circuit is tuned and accordingly may be applied to the reactance tube modulator 20 to effect automatic frequency control of the local oscillator 19 in an entirely conventional manner. The audio frequency filter comprising the series resistor 37 and shunt capacitor 38 prevents this modulator from responding to the audio frequency components of the voltage appearing between signal take-off point and ground. This audio voltage is delivered to the audio frequency amplifier for amplification and ultimate reproduction by the loud speaker 8. Resistor 36 performs the dual functions of radio frequency isolation and, in conjunction with capacitor 35, forms the audio frequency de-emphasis network as employed in the reception of frequency modulated signals.

As will be evident from the above explanation, the signal voltage applied to the two rectifying branches of the circuit may contain both frequency and amplitude variations. Signals of large amplitude cause greater rectified potentials to appear across the load circuits and accordingly the magnitude of the automatic frequency control voltage will depend upon both the deviation of the frequency and the amplitude of the signal applied to the discriminating network. However, the voltage will be plus or minus depending upon whether the frequency is above or below the center frequency and in all cases has the effect of moving the carrier frequency back toward the center frequency.

In the two paths between the signal take-off point 34 and ground, through load resistor 24 and diode 25 and through load resistor 27 and diode 28, the voltages across the diodes 25 and 28 are combined differentially. Accordingly, any variations of amplitude of the signal at center frequency will balance out and will not produce an audio frequency, and for the same reason uniformly distributed noise signals will not produce an audio signal. The two diodes 25 and 28 are connected in series across the two load resistors and hence the voltage across the diodes must at all times equal the voltages across the load resistors. As the total voltage across the two load resistors cannot change rapidly, the total voltage across the two diodes 25 and 28 also cannot vary rapidly in response to rapid fluctuations in signal amplitude. However, the voltages across each diode will vary depending upon the relative radio frequency voltage applied to each branch of the circuit and the audio output signal will be the difference of these two voltages which have a substantially constant total value.

As illustrated in the drawings, the diodes 25, 28 and 40 are all combined in a single envelope together with a triode section 44. This combination of elements is provided by a single commercially available tube of the 6S8-GT type. By utilizing the triode 44 in the first stage of the audio amplifier as shown, a further saving of tubes is realized. This arrangement is not possible in prior discriminator circuits, because in such circuits the various elements of the tubes are at different potentials and a common cathode for a plurality of the elements cannot be used. As shown in the drawing the audio output from the discriminator, appearing across capacitor 35, is applied to the grid of the triode 44. The grid is connected to ground through the biasing resistor 45 and the plate is connected to a source of voltage indicated as +B through resistor 46 to provide the proper operating potentials for the diode 44. The output of the diode is coupled through capacitor 47 to the audio frequency amplifier 17.

It is therefore seen, that a discriminator is provided which will provide a de-emphasized audio output from low level frequency modulated signals and also provide an automatic frequency control voltage varying plus and minus with respect to ground. The rectifying units of the discriminator together with a rectifier for producing automatic volume control signals and one stage of audio amplification are combined in one tube providing a very simple and efficient circuit which will require a minimum of space on a receiver chassis. As the discriminator operates from low level signals, limiters are not required and hence a further saving of tubes and other expensive components results.

Although I have described what is considered to be the preferred embodiment of my invention, it will be apparent that various changes and modifications can be made therein without departing from the intended scope thereof as defined in the appended claims.

I claim:

1. In a frequency discriminating network which is adapted to be excited from a voltage source of variable frequency, an input circuit including a pair of capacitors and a two-terminal adjustable inductor connected in series to tune said input circuit to a particular center frequency, means including a bypassed load resistor and a rectifier connected in series bridging one of said capacitors across said source, means including a second bypassed load resistor and a second rectifier connected in series bridging the other of said capacitors across said source, said rectifiers being connected so that the current passed by one is of opposite phase to the current passed by the other and means for unbalancing said network causing current to flow through said series input circuit with the phase of the current flowing depending upon the frequency of said voltage source.

2. A frequency discriminating network adapted to be excited from a voltage source of variable frequency comprising, an input circuit including a pair of capacitors and a two terminal adjustable inductor connected in a series loop, said inductor tuning said input circuit to a particular center frequency, first and second rectifying paths individually bridging said capacitors across said voltage source, each of said rectifying paths including a rectifying element, a load resistor and a capacitor, said rectifying element of each path being connected in series with said load resistor thereof, said capacitor of each rectifying path being shunted across said load resistor thereof, said rectifying elements being so connected in each rectifying path that current flows in said second path in the direction opposite to current flow in said first path, and means for unbalancing said network causing current to flow through said input circuit with the phase of the current flowing depending upon the frequency of the voltage source.

3. A frequency discriminating network adapted to be excited by a voltage of variable frequency comprising, an input circuit including a pair of capacitors and a two terminal adjustable inductor connected in a series loop, said inductor tuning said input circuit to a particular center frequency, means for applying said voltage to the common connection between said capacitors, first and second rectifying paths each including a load resistor, a capacitor and a diode having a cathode and an anode, said load resistor of said first rectifying path being connected between one terminal of said inductor and said cathode of said diode of said first path, said condenser of said first path being bridged across said load resistor thereof, said load resistor of said second rectifying path being connected between the other terminal of said inductor and said anode of said diode of said second path, said capacitor of said second path being bridged across said load resistor thereof, said anode of said diode of said first path and said cathode of said diode of said second path being connected to ground, means for unbalancing said network causing current to flow through said input circuit with the phase of the current flowing depending upon the frequency of said voltage source, and means for differentially combining the voltages appearing across said rectifiers so that changes in the amplitude of said voltage source are substantially balanced out and the voltage across said rectifiers varies in accordance with variations in the frequency of said source.

4. A frequency discriminating network adapted to be excited by a voltage of variable frequency comprising, an input circuit including a pair of capacitors and a two terminal adjustable inductor connected in a series loop, said inductor tuning said input circuit to a particular center frequency, said voltage being applied to the common connections between said capacitors, a vacuum tube including first and second rectifying elements each including a cathode and an anode, said anode of said first rectifying element and said cathode of said second rectifying element being connected to ground, first and second rectifying paths each including one of said rectifying elements, a load resistor and a condenser, said load resistor of said first rectifying path being connected between one terminal of said inductor and said cathode of said first rectifying element, said condenser of said first rectifying path being bridged across said load resistor thereof, said load resistor of said second rectifying path being connected between the other terminal of said inductor and said anode of said second rectifying element, said capacitor of said second rectifying path being bridged across said load resistor thereof, and means for unbalancing said network causing current to flow through said input circuit with the phase of the current flowing depending upon the frequency of said voltage source.

5. A frequency discriminating network adapted to be excited from a voltage source of variable frequency comprising, an input circuit including a pair of capacitors and a two terminal adjustable inductor connected in a series loop, said inductor tuning said input circuit to a particular center frequency, a vacuum tube including first and second rectifying elements each including a cathode and an anode, said anode of said first rectifying element being connected to said cathode of said second rectifying element, first and second rectifying paths individually bridging said capacitors across said voltage source, each of said rectifying paths including one of said rectifying elements, a load resistor and a capacitor, said load resistor of each rectifying path being connected in series with said first rectifying element thereof, said capacitor of each rectifying path being shunted across said load resistor thereof, said rectifying elements being connected in said rectifying paths so that current flows in said first path in one direction and in said second path in the opposite direction, and means for unbalancing said network causing current to flow through said input circuit with the phase of the current flowing depending upon the frequency of said voltage source.

WILLIAM CULLEN MOORE.

REFERENCES CITED

The following references are of record in the file of this patent:

UNITED STATES PATENTS

| Number | Name | Date |
|---|---|---|
| 2,097,937 | Rust | Nov. 2, 1937 |
| 2,141,338 | Barton | Dec. 27, 1938 |
| 2,276,488 | Hershey | Mar. 17, 1942 |
| 2,279,506 | Reid | Apr. 14, 1942 |
| 2,296,100 | Foster | Sept. 15, 1942 |
| 2,338,526 | Maynard | Jan. 4, 1944 |
| 2,404,359 | Bond | July 23, 1946 |
| 2,410,983 | Koch | Nov. 12, 1946 |
| 2,412,482 | Vilkomerson | Dec. 10, 1946 |

FOREIGN PATENTS

| Number | Country | Date |
|---|---|---|
| 49,629 | France | Feb. 1, 1939 |

OTHER REFERENCES

"Ratio Detectors for F-M Receivers," Radio for October 1945.